United States Patent
Yasuda et al.

(10) Patent No.: US 10,140,070 B2
(45) Date of Patent: Nov. 27, 2018

(54) TERMINAL, INFORMATION PROCESSING APPARATUS, IMAGE FORMING SYSTEM, AND NON-TRANSITORY COMPUTER READABLE MEDIUM

(71) Applicant: FUJI XEROX CO., LTD., Tokyo (JP)

(72) Inventors: Shunichi Yasuda, Kanagawa (JP); Tomohito Takagi, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/884,124

(22) Filed: Oct. 15, 2015

(65) Prior Publication Data
US 2016/0306596 A1  Oct. 20, 2016

(30) Foreign Application Priority Data
Apr. 15, 2015 (JP) .................................. 2015-082943

(51) Int. Cl.
G06F 3/12 (2006.01)
G06F 9/451 (2018.01)
G06F 9/44 (2018.01)
H04N 1/00 (2006.01)

(52) U.S. Cl.
CPC .......... G06F 3/1226 (2013.01); G06F 3/1292 (2013.01); G06F 3/1294 (2013.01); G06F 9/4443 (2013.01); G06F 9/4446 (2013.01); G06F 9/451 (2018.02); G06F 9/453 (2018.02); H04N 1/00 (2013.01)

(58) Field of Classification Search
None
See application file for complete search history.

(56) References Cited

U.S. PATENT DOCUMENTS

| | | | |
|---|---|---|---|
| 2008/0030770 A1* | 2/2008 | Nishioka | G06F 3/1217 358/1.15 |
| 2011/0029346 A1* | 2/2011 | Kong | G06F 3/1203 705/7.38 |
| 2011/0231800 A1* | 9/2011 | Tomita | G06F 3/0482 715/835 |
| 2014/0211257 A1* | 7/2014 | Ishii | H04N 1/32539 358/1.15 |

FOREIGN PATENT DOCUMENTS

| | | |
|---|---|---|
| CN | 102196138 A | 9/2011 |
| JP | H09-290548 A | 11/1997 |
| JP | 2000-276312 A | 10/2000 |

(Continued)

OTHER PUBLICATIONS

Sep. 20, 2018 Office Action issued in Chinese Patent Application No. 201510864551.7.

Primary Examiner — Lennin Rodriguezgonzalez
(74) Attorney, Agent, or Firm — Oliff PLC

(57) ABSTRACT

A terminal includes a display and an availability information acquisition unit. The display displays an icon image. The availability information acquisition unit acquires availability information which indicates whether or not an image forming apparatus is available. The icon image is changed according to the availability information which is acquired by the availability information acquisition unit and indicates whether or not the image forming apparatus is available.

13 Claims, 15 Drawing Sheets

(56) References Cited

FOREIGN PATENT DOCUMENTS

| | | | |
|---|---|---|---|
| JP | 2004-348401 | A | 12/2004 |
| JP | 3832978 | B2 | 10/2006 |
| JP | 3969025 | B2 | 8/2007 |
| JP | 2008-068441 | A | 3/2008 |
| JP | 4435191 | B2 | 3/2010 |
| JP | 4513271 | B2 | 7/2010 |
| JP | 4646312 | B2 | 3/2011 |

* cited by examiner

FIG. 9

MANAGEMENT DATABASE

| APPARATUS ID | INSTALLED LOCATION | TYPE OF EXECUTABLE JOB | AVAILABLE FUNCTION | NOTIFICATION DESTINATION | STATUS | ACQUIRED DATE AND TIME | NUMBER OF STANDBY JOBS | JOB IN PROGRESS | NEXT JOB START TIME | TOTAL NUMBER OF PRINT PAGES | COMPLETION TIME OF ALL JOBS | NECESSITY OF REPLENISHMENT | ESTIMATED AVAILABLE TIME PERIOD |
|---|---|---|---|---|---|---|---|---|---|---|---|---|---|
| 0001 | 12F A OFFICE | ALL TYPES: A | STAPLE: A HOLE PUNCH: A | AAA BBB | A | XX/XX XX:XX | 0 | — | — | — | — | PAPER: SUFFICIENT INK: SUFFICIENT | XX-XX |
| 0002 | 13F A OFFICE | ALL TYPES: A | STAPLE: A HOLE PUNCH: A | CCC DDD | PA | XX/XX XX:XX | Y | PRINT | XX:XX | YY | XX:XX | PAPER: SUFFICIENT INK: SUFFICIENT | XX-XX |
| 0003 | HEAD OFFICE | SCAN: NA COPY: NA | STAPLE: NA HOLE PUNCH: NA | EEE FFF | NA | XX/XX XX:XX | Z | SCAN | XX:XX | ZZ | XX:XX | PAPER: LOW LEVEL INK: LOW LEVEL | XX-XX |
| 0004 | B OFFICE | FAX: NA | STAPLE: NA HOLE PUNCH: NA | GGG HHH | ! | — | — | — | — | — | — | — | XX-XX |

FIG. 12

LIST SCREEN DISPLAY TABLE

| APPARATUS ID | INSTALLED LOCATION | STATUS | ACQUIRED DATE AND TIME | HOME SCREEN DISPLAY | DISPLAY ORDER | NOTIFICATION SETTING |
|---|---|---|---|---|---|---|
| 0001 | 12F A OFFICE | A | XX/XX XX:XX | ✓ | 1 | SET |
| 0002 | 13F A OFFICE | PA | XX/XX XX:XX | — | 2 | SET |
| 0003 | HEAD OFFICE | NA | XX/XX XX:XX | — | 3 | NOT SET |
| | | | | | | |

TERMINAL, INFORMATION PROCESSING APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-082943 filed Apr. 15, 2015.

BACKGROUND (i) Technical Field

The present invention relates to a terminal, an information processing apparatus, an image forming system, and a non-transitory computer readable medium.

(ii) Related Art

An image forming apparatus which may be used by a number of users is often intensively used during a specific period of time and the users thus need to wait. Therefore, it is convenient for the users to be able to confirm whether or not the image forming apparatus is available.

SUMMARY

According to an aspect of the invention, there is provided a terminal including a display and an availability information acquisition unit. The display displays an icon image. The availability information acquisition unit acquires availability information which indicates whether or not an image forming apparatus is available. The icon image is changed according to the availability information which is acquired by the availability information acquisition unit and indicates whether or not the image forming apparatus is available.

BRIEF DESCRIPTION OF THE DRAWINGS

Exemplary embodiments of the present invention will be described in detail based on the following figures, wherein:

FIG. 9 is a diagram illustrating an example of the content of a management database;

FIG. 12 is a diagram illustrating an example of the content of a list screen display table;

DETAILED DESCRIPTION

Exemplary embodiments of the present invention will be described with reference to the drawings.

Figure 1:
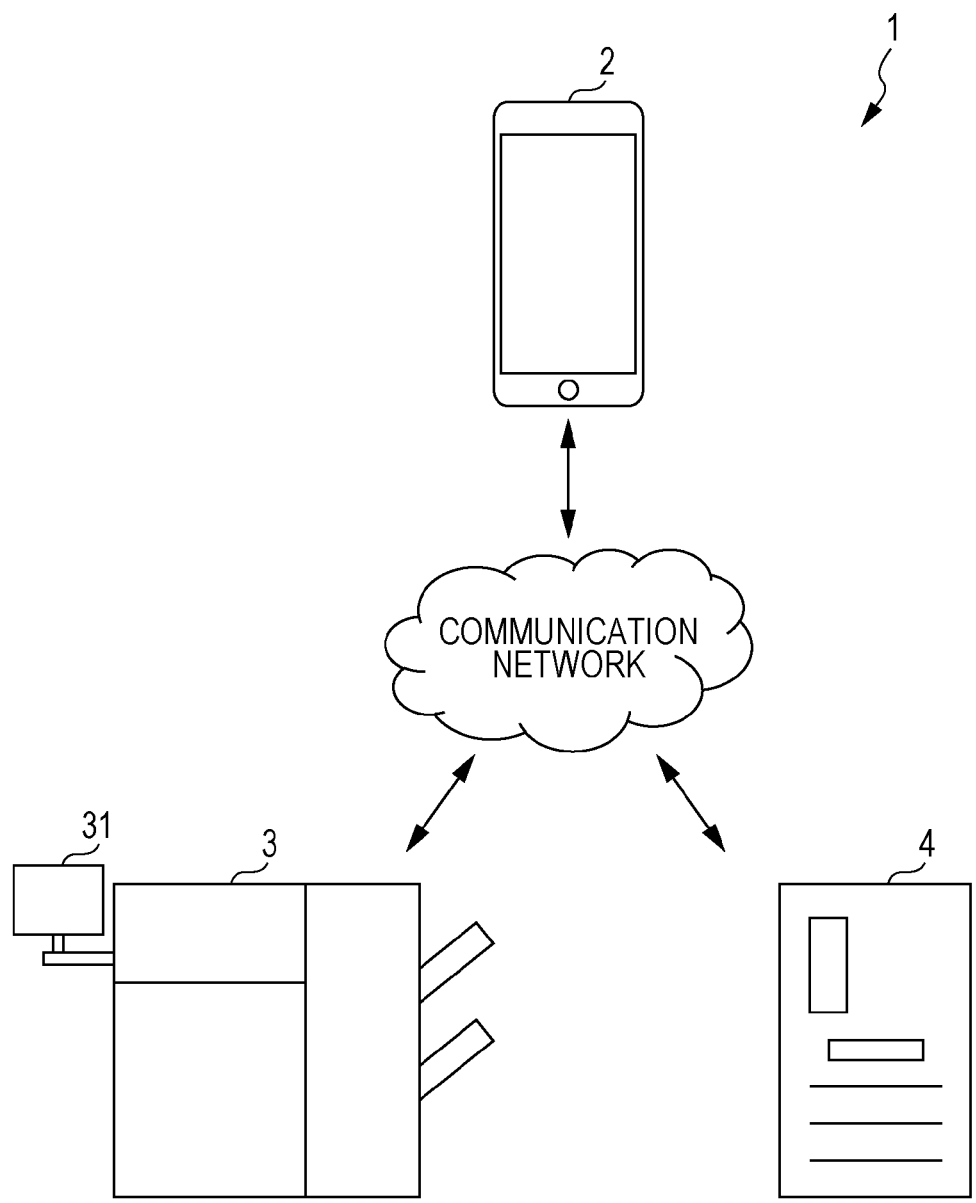
FIG. 1 is a diagram illustrating an example of the configuration of an image forming system.

FIG. 1 is a diagram illustrating an example of the configuration of an image forming system 1. The image forming system 1 includes a terminal 2, an image forming apparatus 3, and a management server 4. The management server 4 is an example of an information processing apparatus. The terminal 2, the image forming apparatus 3, and the management server 4 are connected to a communication network to perform data communication therebetween.

The image forming apparatus 3 includes a printing unit that forms an image on a paper medium, a scanner unit that reads an image on the paper medium, and the like. The image forming apparatus 3 may execute print jobs, copy jobs, scan jobs, FAX jobs, and the like. The printing unit is an example of an image forming unit. Among the above jobs, print jobs and copy jobs are executed using the printing unit, whereas scan jobs and FAX jobs are executed without using the printing unit.

The image forming apparatus 3 also includes an operation panel 31 to be operated by a user. The operation panel 31 is an example of an operation unit. For example, a user moves to the location of the image forming apparatus 3 to operate the operation panel 31 for user authentication, and then issues an instruction for execution of various jobs. For print jobs, the user transmits data in advance from the terminal 2 or a different computer, and then performs the above series of operations.

Figure 2:
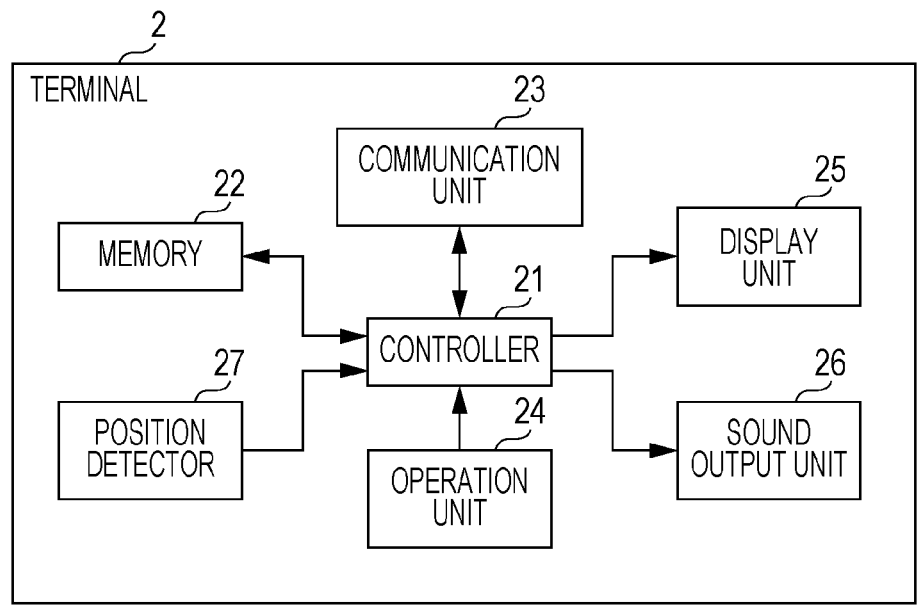
FIG. 2 is a block diagram illustrating an example of the configuration of a terminal.

FIG. 2 is a block diagram illustrating an example of the configuration of the terminal 2. The terminal 2 is implemented by, for example, a smart phone, a tablet-type computer, a personal computer, or the like. In the explanation provided below, a smart phone is used as the terminal 2. As illustrated in FIG. 2, the terminal 2 includes a controller 21, a memory 22, a communication unit 23, an operation unit 24, a display unit 25, a sound output unit 26, and a position detector 27.

The controller 21 is, for example, a computer which includes a central processing unit (CPU) and the like. The controller 21 performs information processing in accordance with an operating system and other programs. The memory 22 includes a principal memory (for example, a random access memory (RAM)) and an auxiliary memory (for example, a solid-state drive (SSD)). The communication unit 23 transmits and receives data to and from a different apparatus via the communication network.

Programs and data are supplied to the terminal 2 from a remote location via the communication network. Furthermore, programs and data stored in a memory card or the like as an example of an information storage medium may be read and stored into the memory 22.

The operation unit 24 is, for example, a pointing device with which a user designates a position on a screen displayed on the display unit 25. For example, a touch panel which is arranged over the display unit 25 is provided as the operation unit 24.

The display unit 25 is, for example, a liquid crystal display, an organic electroluminescence (EL) display, or the like to display various screens. The sound output unit 26 is, for example, a speaker, a headphone, or the like to output sound data.

The position detector 27 is a sensor for detecting the current position of the terminal 2. For example, a global positioning system (GPS) sensor that obtains positioning information based on a signal from a GPS satellite is provided as the position detector 27.

Figure 3:
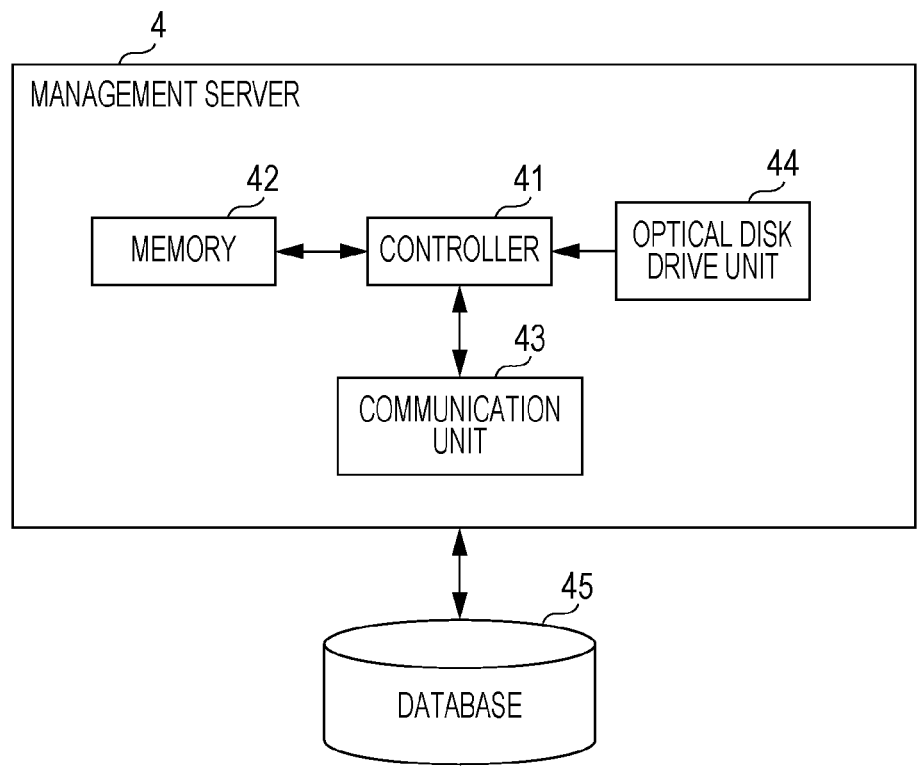
FIG. 3 is a block diagram illustrating an example of the configuration of a management server.

FIG. 3 is a block diagram illustrating an example of the configuration of the management server 4. The management server 4 is implemented by, for example, a server computer. As illustrated in FIG. 3, the management server 4 includes a controller 41, a memory 42, a communication unit 43, and an optical disk drive unit 44.

Among the above units, the controller 41, the memory 42, and the communication unit 43 are similar to the controller 21, the memory 22, and the communication unit 23 of the terminal 2. The optical disk drive unit 44 reads programs and data stored in an optical disk as an example of an information storage medium.

The programs and data stored in the optical disk are read by the optical disk drive unit 44 and stored into the memory 42. Furthermore, the programs and data may be supplied to the management server 4 from a remote location via the communication network.

The management server 4 may access a database 45. The database 45 may be established within the management server 4 or may be established within a server computer different from the management server 4.

In the image forming system 1, the image forming apparatus 3 transmits various types of information indicating the current processing status and the like to the management server 4. The management server 4 holds information received from the image forming apparatus 3 in the database 45, and determines, on the basis of the information, whether or not the image forming apparatus 3 is available. The terminal 2 acquires information including the result of a determination as to whether or not the image forming apparatus 3 is available, the current processing status, and the like from the management server 4, and displays the acquired information on the display unit 25.

Hereinafter, a manner in which display of the terminal 2 is done will be specifically explained.

[Widget Display]

The terminal 2 displays, using a widget engine, whether or not the image forming apparatus 3 is available. The widget engine is a relatively small-sized application which operates through an icon image displayed on a home screen. The home screen is also called a desk top or a standby screen.

Figure 4:
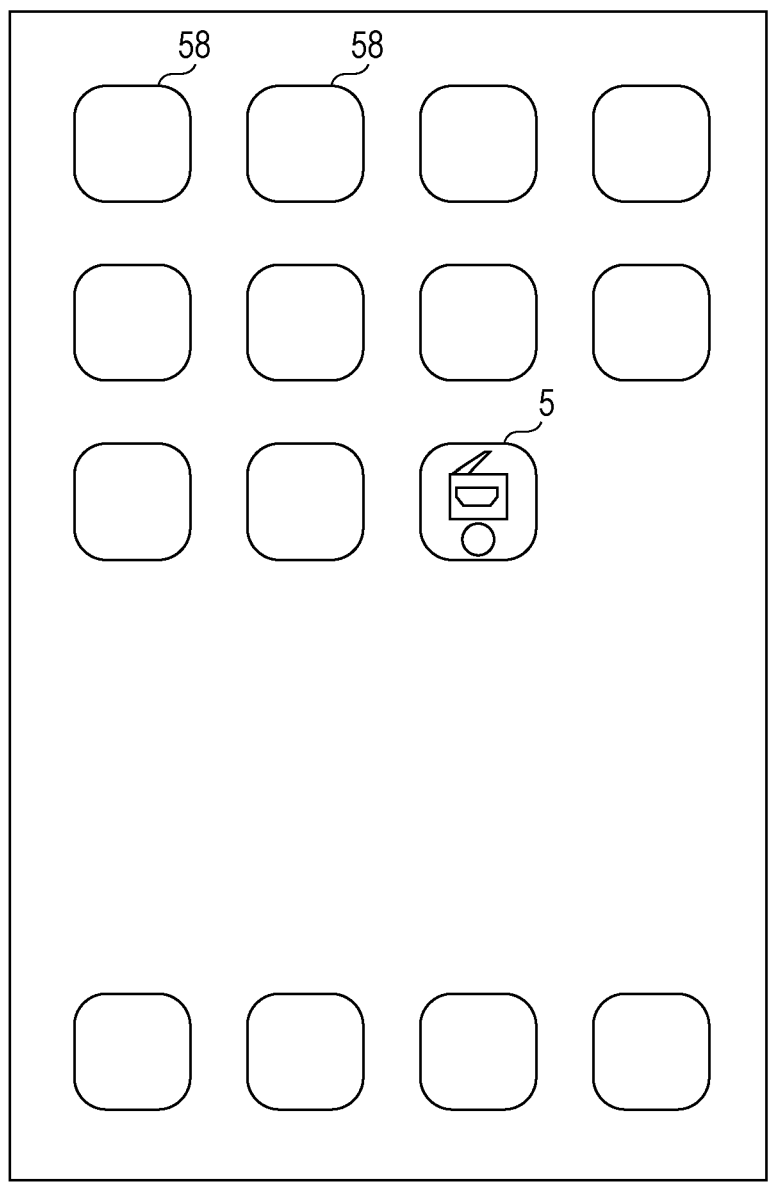
FIG. 4 is a diagram illustrating a display example of a home screen.
Figure 5A:
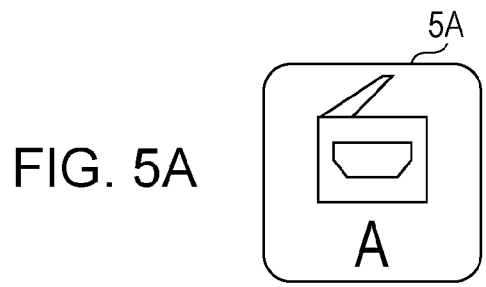
FIGS. 5A to 5E are diagrams illustrating display examples of an icon image.
Figure 5B:
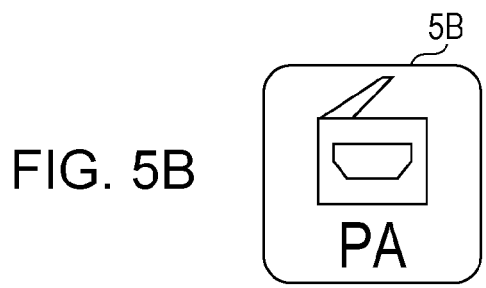
Figure 5C:
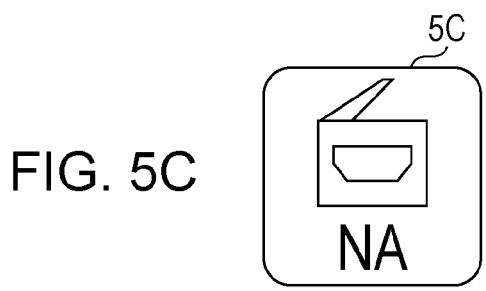
Figure 5D:
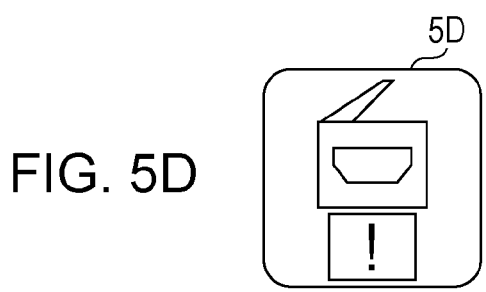
Figure 5E:
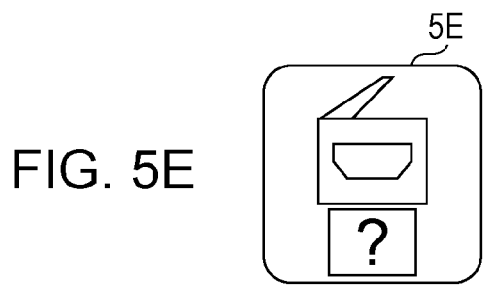
Figure 6A:
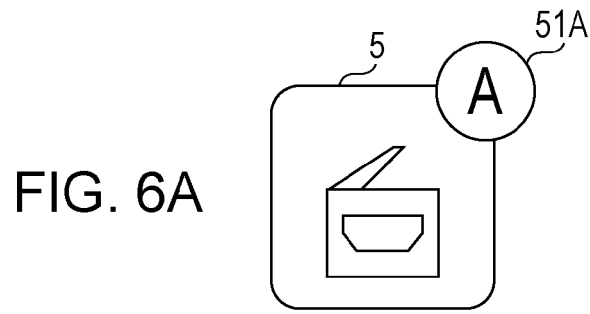
FIGS. 6A to 6E are diagrams illustrating display examples of an icon image and an added image.
Figure 6B:
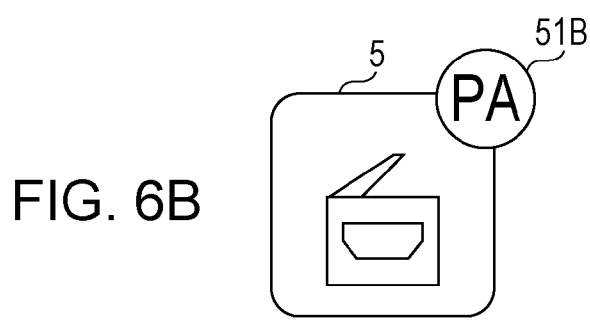
Figure 6C:
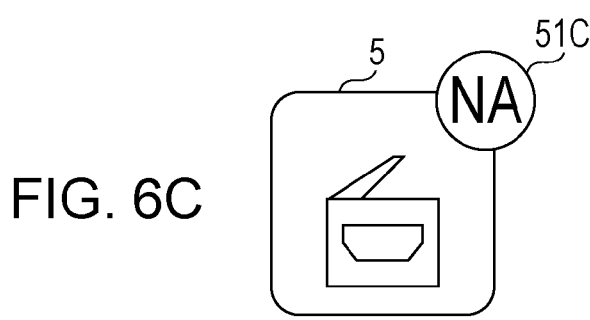
Figure 6D:
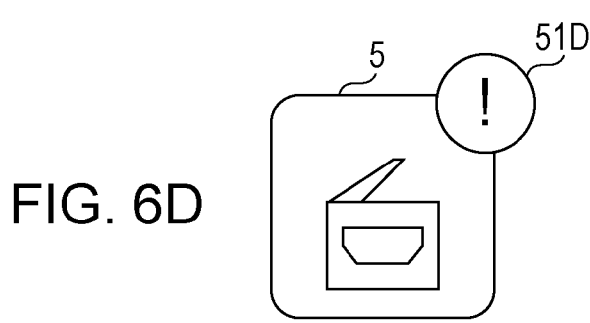
Figure 6E:
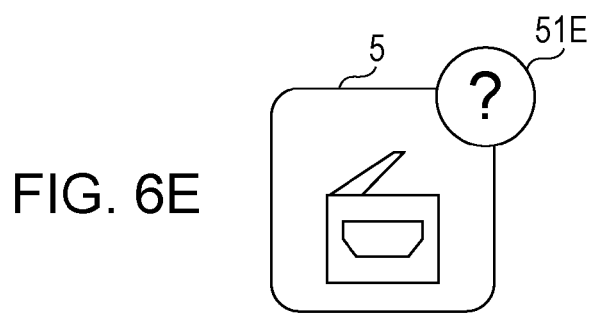

FIG. 4 is a diagram illustrating a display example of a home screen displayed on the display unit 25 of the terminal 2. On the home screen, plural icon image parts 58 are arranged, and icon images 5 associated with widget engines are arranged in the corresponding icon image parts 58. A widget engine is an example of a first application, and the icon images 5 are examples of a first icon image.

An image displayed as the icon image 5 is switched according to an operation of the widget engine. That is, plural icon images (hereinafter, referred to as availability display icon images) for indicating whether or not the image forming apparatus 3 is available are prepared in advance. When one of the availability display icon images is selected based on an operation of a widget engine, the selected availability display icon image is displayed as the icon image 5. Thus, the user is able to understand whether or not the image forming apparatus 3 is available.

FIGS. 5A to 5E are diagrams illustrating display examples of an availability display icon image. In this example, five types of availability display icon images 5A to 5E are prepared. The availability display icon images 5A to 5E are examples of an availability display image. In each of the availability display icon images 5A to 5E, a sign (for example, "A", "PA", "NA", "!", "?", or the like) for indicating whether or not the image forming apparatus 3 is available is rendered.

The availability display icon image 5A in which the sign "A" is rendered represents that the image forming apparatus 3 is available. The availability display icon image 5B in which the sign "PA" is rendered represents that a job which uses the printing unit (a print job or copy job) may not be executed but a job which does not use the printing unit (a scan job or a FAX job) may be executed. The availability display icon image 5C in which the sign "NA" is rendered represents that the image forming apparatus 3 is not available because another user is using the image forming apparatus 3.

The availability display icon image 5D in which the sign "!" is rendered represents that the management server 4 is not able to acquire information from the image forming apparatus 3 because, for example, the image forming apparatus 3 is turned off or a failure is occurring at the image forming apparatus 3. The availability display icon image 5E in which the sign "?" is rendered represents that the terminal 2 is not able to acquire information from the management server 4 because, for example, a communication failure is occurring between the management server 4 and the terminal 2.

Specifically, in the case where the operation panel 31 of the image forming apparatus 3 is being operated by a user, the availability display icon image 5C, in which the sign "NA" representing that the image forming apparatus 3 is not available is rendered, is selected. As described above, the user needs to move to the location of the image forming apparatus 3 and operate the operation panel 31 to issue an instruction for execution of a job. Therefore, if another user is operating the operation panel 31, the user is not able to use the image forming apparatus 3. In the case where the operation panel 31 of the image forming apparatus 3 is not being operated and no job is being executed at the image forming apparatus 3, the availability display icon image 5A, in which the sign "A" representing that the image forming apparatus 3 is available is rendered, is selected.

In the case where the operation panel 31 of the image forming apparatus 3 is not being operated and a job which uses the printing unit (a print job or copy job) is being executed at the image forming apparatus 3, the availability display icon image 5B, in which the sign "PA" representing that a job which does not use the printing unit (a scan job or a FAX job) may be executed is rendered, is selected. That is, while a job which uses the printing unit to print a relatively large number of pages is being executed at the image forming apparatus 3, the user who issued the instruction for execution of the job does not operate the operation panel 31, and may thus move away from the image forming apparatus 3. During this period, the image forming apparatus 3 may execute a job as long as the job does not use the printing unit.

As described above, since availability or unavailability of the image forming apparatus 3 may be displayed using the availability display icon images 5A to 5E, a user is able to understand whether or not the image forming apparatus 3 is available even if the user is at a location where the user is not able to see the image forming apparatus 3 directly. In particular, by displaying the availability display icon image 5B, in which the sign "PA" representing that a job which does not use the printing unit (a scan job or FAX job) may be executed is rendered, the image forming apparatus 3 may be used efficiently.

The display of the terminal 2 is not necessarily done in the manner explained above. An added image which is added to the icon image 5 and displayed may be switched according to an operation of the widget engine. That is, plural added images (hereinafter, referred to as availability display added images) for indicating whether or not the image forming apparatus 3 is available are prepared in advance. When one of the availability display added images is selected based on an operation of a widget engine, the selected availability display added image is added to the icon image 5 and displayed. Thus, the user is able to understand whether or not the image forming apparatus 3 is available.

FIGS. 6A to 6E are diagrams illustrating display examples of an icon image and an availability display added image. In this example, five types of availability display added images 51A to 51E are prepared. The availability display added images 51A to 51E are also examples of an availability display image. In each of the availability display added images 51A to 51E, a sign (for example, "A", "PA", "NA", "!", "?", or the like) for indicating whether or not the image forming apparatus 3 is available is rendered. Use of the availability display added images 51A to 51E are similar to that of the availability display icon images 5A to 5E described above.

Figure 7:
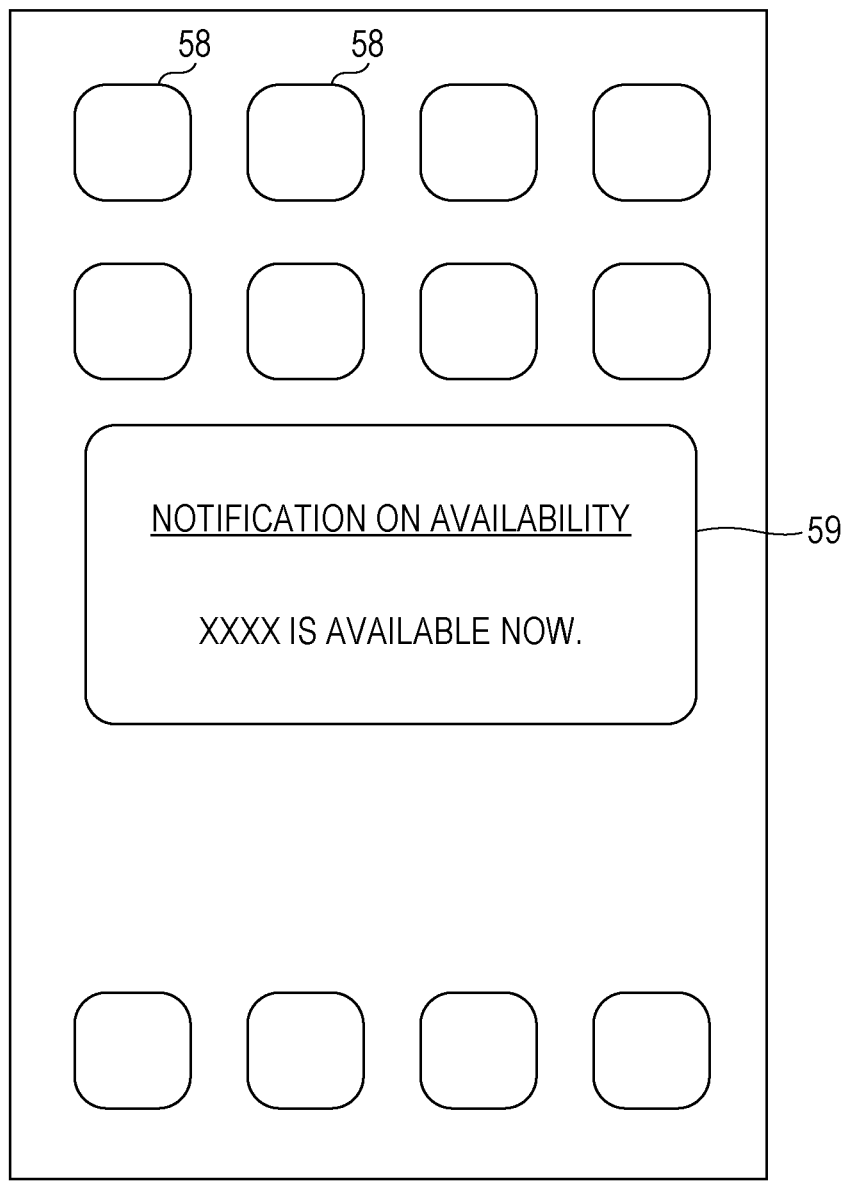
FIG. 7 is a diagram illustrating a display example of a notification screen.

FIG. 7 is a diagram illustrating a display example of a notification screen displayed on the display unit 25 of the terminal 2. When receiving notification indicating that the status of the image forming apparatus 3 has been changed from an unavailable state into an available state, the terminal 2 displays a notification screen 59 on a screen, such as the home screen. Display of the notification screen 59 is achieved by an operation of an application for notification display, which is different from a widget engine. A character string representing that the status of the image forming apparatus 3 has been changed from the unavailable state into the available state is rendered on the notification screen 59.

FIG. 9 is a diagram illustrating an example of the content of a management database included in the database 45 of the management server 4. The management database holds various types of information including the current processing status received from the image forming apparatus 3 and the result of a determination, based on the information, as to whether or not the image forming apparatus 3 is available.

As illustrated in FIG. 9, the management database includes fields of "apparatus ID", "installed location", "type of executable job", "available function", "notification destination", "status", "acquired date and time", "number of standby jobs", "job in progress", "next job start time", "total number of print pages", "completion time of all jobs", "necessity of replenishment", and "estimated available time period". Among the above fields, "status is mainly used for widget display. The other fields are mainly used for application screen display, which will be described later.

"Apparatus ID" represents identification information of the image forming apparatus 3. "Installed location" represents the location where the image forming apparatus 3 is installed. "Type of executable job" represents the type of a job that may be executed by the image forming apparatus 3 (for example, a print job, a copy job, a scan job, a FAX job, etc.). "Available function" represents a function which is available at the image forming apparatus 3 (for example, staple, hole punch, etc.). The above values are recorded, for example, when an entry for a new image forming apparatus 3 is created in the management database.

"Notification destination" represents a destination to which notification indicating that the status of the image forming apparatus 3 has been changed from the unavailable state into the available state is to be sent. For example, an address is recorded as the "notification destination" in accordance with a request from the terminal 2.

"Status" represents the result of a determination as to whether or not the image forming apparatus 3 is available. The determination result recorded as the "status" is, for example, generated and updated when the management server 4 receives various types of information including the current processing status from the image forming apparatus 3. Furthermore, the determination result recorded as the "status" is used for the management server 4 to transmit availability information, which will be described later, to the terminal 2.

The determination result recorded as the "status" corresponds to any of the availability display icon images 5A to 5D described above. For example, the status is categorized into an available state "A" which represents that the image forming apparatus 3 is available, a partially available state "PA" which represents that a job which uses the printing unit may not be executed but a job which does not use the printing unit may be executed, an unavailable state "NA" which represents that the image forming apparatus 3 is not available, and a non-operating state "!" which represents that information may not be acquired from the image forming apparatus 3.

"Acquired date and time" represents the date and time at which the management server 4 received various types of information indicating the current processing status and the like from the image forming apparatus 3. The current processing status includes, for example, "number of standby jobs", "job in progress", "next job start time", "total number of print pages", "completion time of all jobs", and the like.

"Number of standby jobs" represents the number of jobs waiting for execution. "Job in progress" represents the type of a job currently being processed. "Next job start time" represents the time at which execution of the next job starts. "Total number of print pages" represents the total number of pages to be printed in jobs waiting for execution. "Completion time of all jobs" represents the time at which all the jobs waiting for execution is completed. "Necessity of replenishment" represents the consumption degree of consumables such as paper and ink.

The above values are recorded, for example, when the management server 4 receives various types of information indicating the current processing status and the like from the image forming apparatus 3 or generated based on the information and recorded. Furthermore, these values are used when the terminal 2 displays an application screen, which will be described later. The type of a job currently being processed, which is recorded as the "job in progress" is also used for determining whether or not the image forming apparatus 3 is available.

"Estimated available time period" represents the estimated available time period of the image forming apparatus 3 which is calculated based on the use results of the image forming apparatus 3. For example, the use results of the image forming apparatus 3 is accumulated in the database 45 of the management server 4, and the management server 4 sets the estimated available time period based on the accumulated use results. For example, a time period with a relatively low use frequency is set as the estimated available time period.

Figure 8:
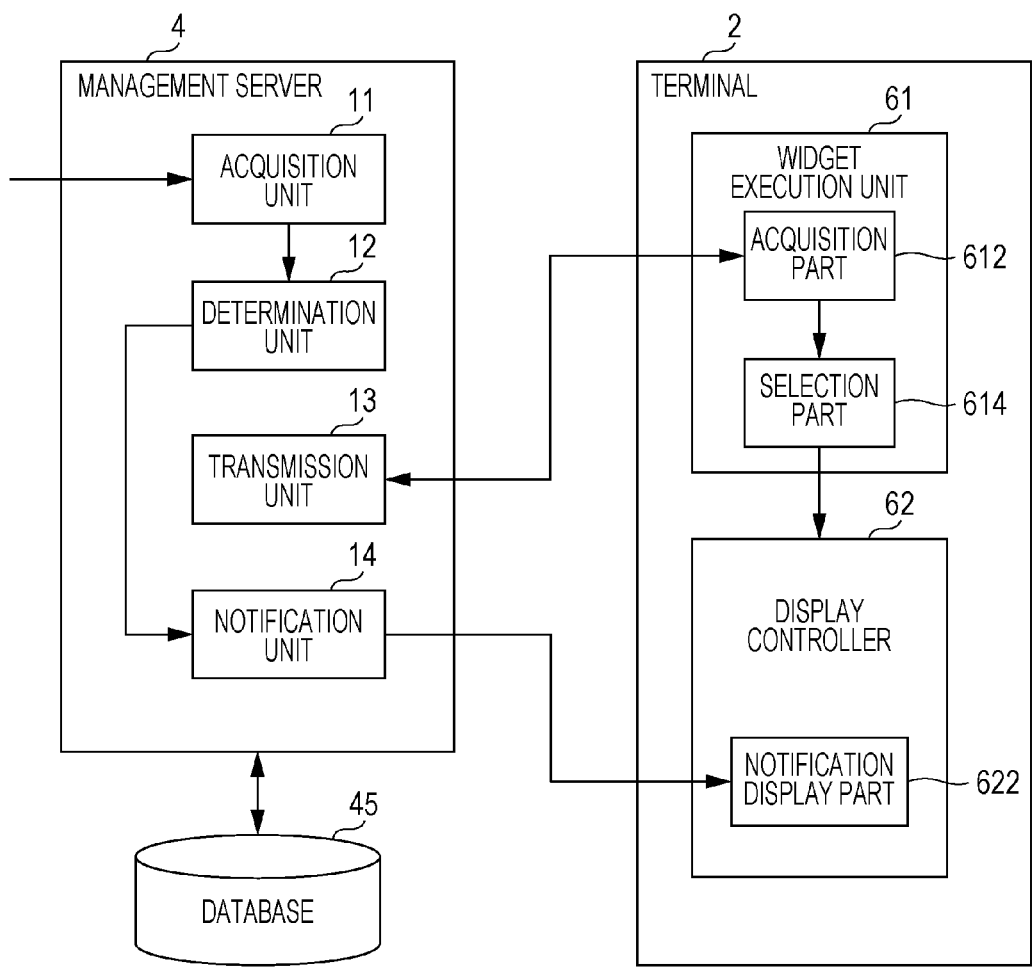
FIG. 8 is a block diagram illustrating an example of the functional configuration of a management server and a terminal.

FIG. 8 is a block diagram illustrating an example of the functional configuration of the management server 4 and the terminal 2. The management server 4 includes an acquisition unit 11, a determination unit 12, a transmission unit 13, and a notification unit 14. The above functional units are implemented when the controller 41 performs processing according to a program.

The terminal 2 includes a widget execution unit 61 and a display controller 62. The widget execution unit 61 includes an acquisition part 612 and a selection part 614. The display controller 62 includes a notification display part 622. The functional units are implemented when the controller 21 performs processing according to a program.

The acquisition unit 11 of the management server 4 regularly receives from the image forming apparatus 3 various types of information including the current processing status of the image forming apparatus 3. The acquired information is recorded in the management database included in the database 45 or supplied to the determination unit 12 for a determination as to whether or not the image forming apparatus 3 is available.

The information transmitted from the image forming apparatus 3 to the management server 4 includes, for example, information indicating whether or not the image forming apparatus 3 is executing a job and information indicating which type of job the image forming apparatus 3 is currently executing.

Furthermore, the information transmitted from the image forming apparatus 3 to the management server 4 includes, for example, information indicating whether or not the operation panel 31 is being operated. For example, while the operation panel 31 is being operated, a specific signal indicating that the operation panel 31 is being operated may be supplied to the management server 4. Furthermore, a human sensor may be provided at the image forming apparatus 3 so that a specific signal indicating that the operation panel 31 is being operated is supplied to the management server 4 while a person is present around the operation panel 31.

The information transmitted from the image forming apparatus 3 to the management server 4 also includes, for example, the number of standby jobs, the next job start time, the total number of print pages, the completion time of all jobs, and the like (see FIG. 9).

The determination unit 12 determines, based on the information acquired by the acquisition unit 11, whether or not the image forming apparatus 3 is available, and records the determination result as the "status" in the management database (see FIG. 9).

Figure 10:
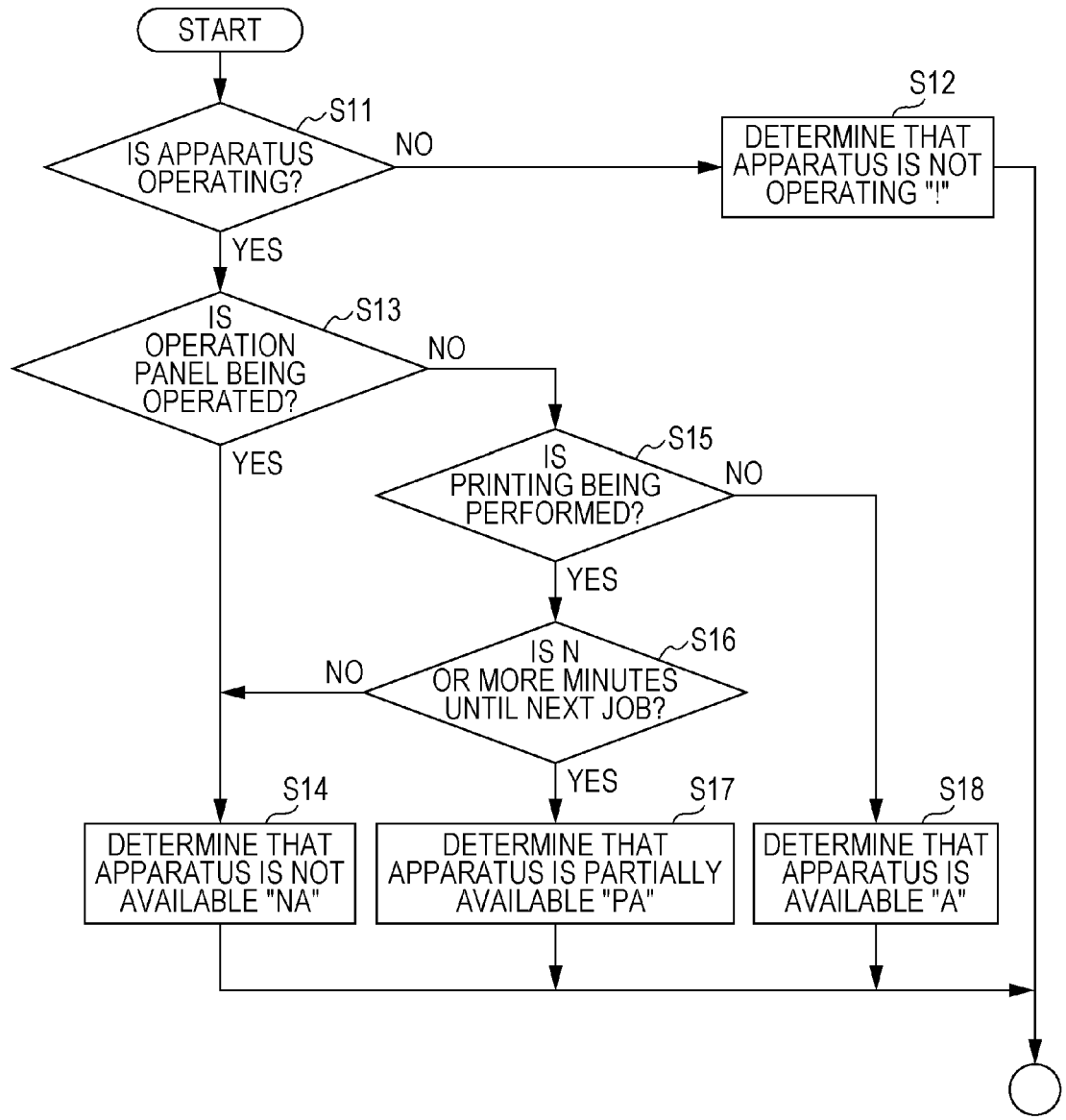
FIG. 10 is a flowchart illustrating an operation example of a terminal.

FIG. 10 is a flowchart illustrating an example of a determination process performed by the determination unit 12. When the determination process starts, the determination unit 12 determines whether or not the image forming apparatus 3 is operating (S11).

When the image forming apparatus 3 is not operating (S11; No), that is, the management server 4 is not able to acquire information from the image forming apparatus 3 because, for example, the image forming apparatus 3 is turned off or a failure is occurring at the image forming apparatus 3, the determination unit 12 determines that the image forming apparatus 3 is in the non-operating state "!" which represents that information may not be acquired from the image forming apparatus 3 (S12).

When the image forming apparatus 3 is operating (S11; Yes), the determination unit 12 determines whether or not the operation panel 31 is being operated (S13).

When the operation panel 31 is being operated (S13; Yes), the determination unit 12 determines that the image forming apparatus 3 is in the unavailable state "NA" which represents that the image forming apparatus 3 is not available (S14). The determination as to whether or not the operation panel 31 is being operated is made by determining whether or not a specific signal indicating that the operation panel 31 is being operated is supplied to the management server 4, as described above.

When the operation panel 31 is not being operated (S13; No), the determination unit 12 determines whether or not the image forming apparatus 3 is executing a job which uses the printing unit (S15).

When the image forming apparatus 3 is executing a job which uses the printing unit (S15; Yes), the determination unit 12 determines whether or not the time until the next job is started is equal to or more than a threshold (S16). The time until the next job is started is obtained by referring to the "next job start time" in the management database.

When the time until the next job is started is equal to or more than the threshold (S16; Yes), the determination unit 12 determines that the image forming apparatus 3 is in the partially available state "PA" which represents that a job which uses the printing unit (a print job or a copy job) may not be executed but a job which does not use the printing unit (a scan job or a FAX job) may be executed (S17).

When the time until the next job is started is less than the threshold (S16; No), the determination unit 12 determines that the image forming apparatus 3 is in the unavailable state "NA" which represents that the image forming apparatus 3 is not available (S14).

Such a determination result is obtained in order to ensure that when a job which does not use the printing unit is started by a user who believes that the image forming apparatus 3 is in the partially available state "PA", the job will not overlap the next job.

Furthermore, when a job which uses the printing unit is not being executed (S15; No), the determination unit 12 determines that the image forming apparatus 3 is in the available state "A" which represents that the image forming apparatus 3 is available (S18). When the status of the image forming apparatus 3 is changed from the unavailable state "NA", the partially available state "PA", or the non-operating state "!" into the available state "A", the determination unit 12 notifies the notification unit 14 of the change of the status.

Referring back to FIG. 8, the transmission unit 13 transmits availability information which indicates whether or not the image forming apparatus 3 is available, in accordance with a request from the terminal 2. The availability information is generated when a determination result recorded as the "status" of the management database (see FIG. 9) is read. That is, the availability information indicates that the image forming apparatus 3 is in one of the available state "A", the unavailable state "NA", the partially available state "PA", and the non-operating state "!".

When the image forming apparatus 3 is changed from the unavailable state "NA", the partially available state "PA", or the non-operating state "!" into the available state "A", the notification unit 14 transmits to the terminal 2 notification display information for displaying the notification screen 59 (see FIG. 7).

The widget execution unit 61 of the terminal 2 is implemented when the controller 21 executes the widget engine.

The acquisition part 612 included in the widget execution unit 61 regularly acquires from the management server 4 availability information which indicates whether or not the image forming apparatus 3 is available.

The selection part 614 included in the widget execution unit 61 selects, based on the availability information acquired by the acquisition part 612, an image displayed as the icon image 5 on the home screen from among the plural availability display icon images 5A to 5E (see FIGS. 5A to 5E), and notifies the display controller 62 of the selected image.

Specifically, when the content of the availability information indicates the available state "A", the availability display icon image 5A, in which the sign "A" which represents that the image forming apparatus 3 is available is rendered, is selected.

When the content of the availability information indicates the partially available state "PA", the availability display icon image 5B, in which the sign "PA" which represents that a job which uses the printing unit may not be executed but a job which does not use the printing unit may be executed is rendered, is selected.

When he content of the availability information indicates the unavailable state "NA", the availability display icon image 5C, in which the sign "NA" which represents that the image forming apparatus 3 is not available is rendered, is selected.

When the content of the availability information is in the non-operating state "!", the availability display icon image 5D, in which the sign "!" which represents that the management server 4 is not able to acquire information from the image forming apparatus 3 is rendered, is selected.

When availability information may not be acquired from the management server 4, the availability display icon image 5E, in which the sign "?" which represents that the terminal 2 is not able to acquire information from the management server 4 is rendered, is selected.

The display controller 62 is an example of a display, and controls the display unit 25 to display the home screen (see FIG. 4). An image selected from among the plural availability display icon images 5A to 5E (see FIGS. 5A to 5E) by the selection part 614 is displayed as the icon image 5 arranged on the home screen, and is switched regularly.

The notification display part 622 included in the display controller 62 acquires notification display information from the management server 4 when the image forming apparatus 3 is changed from the unavailable state "NA", the partially available state "PA", or the non-operating state "!" into the available state "A", and displays the notification screen 59 (see FIG. 7) on the screen such as the home screen.

The widget display described above may be modified as described below. For example, processing by the management server 4 or the terminal 2 may employ the current position of the terminal 2 detected by the position detector 27 of the terminal 2.

For example, the current position of the terminal 2 may be added to a request from the terminal 2, and the management server 4 may generate availability information based on the status of the image forming apparatus 3 closest to the terminal 2, and transmit the generated availability information to the terminal 2. Alternatively, the management server 4 may transmit availability information of plural image forming apparatuses 3 in association with the installed locations of the image forming apparatuses 3, and the terminal 2 may select an image based on the availability information of the image forming apparatus 3 closest to the terminal 2.

Furthermore, plural statuses corresponding to the distances from the image forming apparatuses 3 may be prepared (for example, in such a manner that a more distant apparatus is displayed as being able to be used more preferentially), and the management server 4 may generate availability information based on the statuses corresponding to the distances between the terminal 2 and the image forming apparatuses 3, and transmit the generated availability information to the terminal 2. Alternatively, the management server 4 may transmit plural pieces of availability information in association with distances, and the terminal 2 may select an image according to the availability information of the corresponding distance.

The current position of the terminal 2 detected by the position detector 27 of the terminal 2 is not necessarily used. For example, the current position of the terminal 2 may be calculated from information of the installed location of a communication apparatus (for example, an access point) which communicates with the terminal.

[Application Display Screen]

In addition to the widget display described above, the terminal 2 displays, in accordance with an operation of an application, a screen (hereinafter, referred to as an application display screen) describing the result of a determination as to whether or not the image forming apparatus 3 is available, the current processing status, and the like on the display unit 25.

An application is associated with an icon image 5 (see FIG. 4) arranged on the home screen, in a manner similar to a widget engine. When an icon image 5 is selected by a user, the application is activated, and a status list screen described below is displayed.

Figure 11:
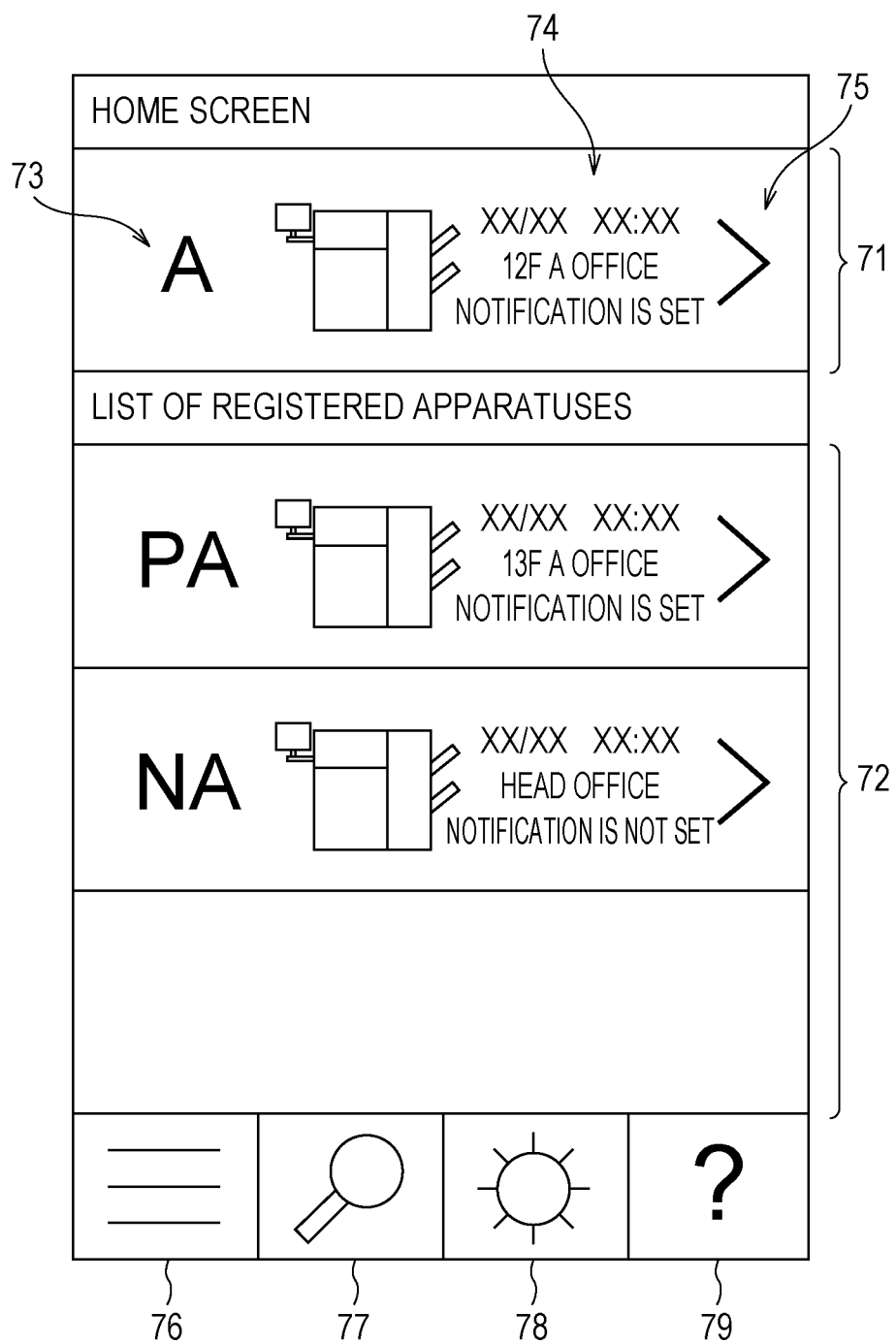
FIG. 11 is a diagram illustrating a display example of a status list screen.

FIG. 11 is a diagram illustrating a display example of a status list screen. FIG. 12 is a diagram illustrating an example of the content of a list screen display table for displaying the status list screen.

As illustrated in FIG. 11, on the status list screen, a target apparatus display field 71 in which information of the image forming apparatus 3 as a target of widget display on the home screen is displayed and a registered apparatus display field 72 in which information of the other registered image forming apparatuses 3 is displayed, are provided.

As items included in the target apparatus display field 71 or the registered apparatus display field 72, an availability display image 73 for displaying whether or not the image forming apparatus 3 is available, an apparatus information display image 74 for displaying information of the image forming apparatus 3, and a detail reference button 75 for displaying an apparatus detail screen (see FIG. 13) described later, are arranged.

Signs rendered as the availability display images 73 are similar to the availability display icon images 5A to 5E described above (see FIGS. 5A to 5E), and are switched according to the availability information acquired from the management server 4. Character strings rendered as the apparatus information display images 74 include, for example, the acquired date and time, the installed location, presence or absence of notification, and the like.

In the lowest portion of the status list screen, a list reference button 76 for displaying an apparatus list screen, which will be described later (see FIG. 14), an apparatus search button 77 for displaying an apparatus search screen, which will be described later (see FIG. 15), a setting change button 78 for setting registration of an apparatus, necessity of notification, and the like, and a help reference button 79 for referring to help are arranged.

As illustrated in FIG. 12, the list screen display table includes fields of "apparatus ID", "installed location", "status", "acquired date and time", "home screen display", "display order", and "notification setting".

"Apparatus ID" represents identification information of the image forming apparatus 3. "Installed location" represents the location where the image forming apparatus 3 is installed. The value of the "installed location" is rendered as a part of the apparatus information display image 74 on the status list screen. The value of the "installed location" is acquired from the management database of the management server 4 and recorded, for example, when an entry of a new image forming apparatus 3 is registered with the list screen display table, or the like.

"Status" represents the result of a determination as to whether or not the image forming apparatus 3 is available. The value of the "status" is rendered as the availability display image 73 on the status list screen. "Acquired date and time" represents the date and time when the management server 4 acquired information from the image forming apparatus 3 or the date and time when a determination result was generated based on the information. The value of the "acquired date and time" is rendered as a part of the apparatus information display image 74 on the status list screen.

The values of the "status" and the "acquired date and time" are acquired from the management database of the management server 4 and recorded, for example, when a user selects an icon image 5 on the home screen and an application is activated, or the lie. In this example, rapid display is achieved by only acquiring the values of the "status" and the "acquired date and time" from the management database for displaying the status list screen.

"Home screen display" represents that the apparatus is a target of widget display on the home screen, that is, the apparatus is displayed in the target apparatus display field 71 on the status list screen. "Display order" represents the display order on the status list screen. The first apparatus is displayed in the target apparatus display field 71, and the second and later apparatuses are displayed in ascending order in the registered apparatus display field 72. The display order may be changed by a user operation.

"Notification setting" represents whether or not to receive notification display information from the management server 4. The value of the "notification setting" is rendered as a part of the apparatus information display image 74 on the status list screen. The value of the "notification setting" is set, for example, on a setting change screen (not illustrated in figures) which is displayed when the setting change button 78 is selected. When "Set" is designated, the terminal 2 requires the management server 4 to include the address of the terminal 2 in the "notification destination" in the management database (see FIG. 9).

In this example, the list screen display table is held in the terminal 2. However, the list screen display table may be held in the management server 4.

Figure 13:
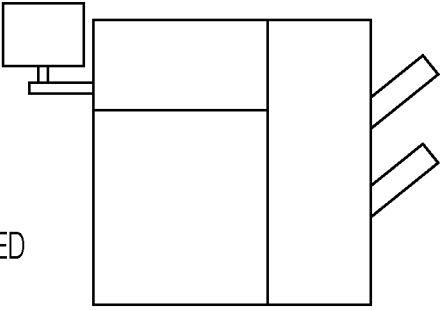
FIG. 13 is a diagram illustrating a display example of an apparatus detail screen.

FIG. 13 is a diagram illustrating a display example of an apparatus detail screen. The apparatus detail screen is displayed when the detail reference button 75 included in the status list screen (see FIG. 11) is selected. On the apparatus detail screen, various types of information including the current processing status of the selected image forming apparatus 3 and the like are described.

The various types of information described on the apparatus detail screen are acquired from the management database of the management server 4. In this example, the values described in almost all of the fields of the management database are used for the apparatus detail screen. For example, on the apparatus detail screen, in addition to the result of a determination as to whether or not the image forming apparatus 3 is available, the type of an executable job, an available function, necessity of replenishment of consumables, the current processing status (the number of standby jobs, the total number of print pages, and the like), the estimated available time period, and the like are displayed. A user is able to obtain various types of information of a desired image forming apparatus 3 by referring to the apparatus detail screen.

Figure 14:
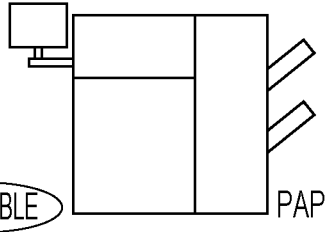
FIG. 14 is a diagram illustrating a display example of an apparatus list screen.

FIG. 14 is a diagram illustrating a display example of an apparatus list screen. The apparatus list screen is displayed when the list reference button 76 included in the status list screen (see FIG. 11) is selected. On the apparatus list screen, the type of jobs and available functions which may be executed by all the image forming apparatuses 3 that may be referred to or the registered image forming apparatuses 3 are described.

The information described on the apparatus list screen is acquired from the management database of the management server 4. In this example, the values described as the "type of executable job" and the "available function" in the management database are used for the apparatus list screen. By referring to the apparatus list screen, the user is able to understand which type of job may be executed and which function may be available by which image forming apparatus 3.

Plural image forming apparatuses 3 displayed on the apparatus list screen may be arranged, for example, in the order of proximity to the terminal 2. For example, the current position of the terminal 2 is added to a request from the terminal 2, and the management server 4 generates screen information of the apparatus list screen in which the image forming apparatuses 3 are arranged in the order of proximity to the terminal 2 based on the "installed location" in the management database, and transmits the screen information of the apparatus list screen to the terminal 2.

Furthermore, the plural image forming apparatuses 3 displayed on the apparatus list screen may be arranged, for example, in the order in which an apparatus becomes available. For example, the management server 4 generates screen information of the apparatus list screen in which the image forming apparatuses 3 are arranged in the order in which an apparatus becomes available, based on the "completion time of all jobs" of the management database, and transmits the generated screen information of the apparatus list screen to the terminal 2. The image forming apparatuses 3 may be arranged in ascending order of the "number of standby jobs" or the "total number of print pages".

Figure 15:
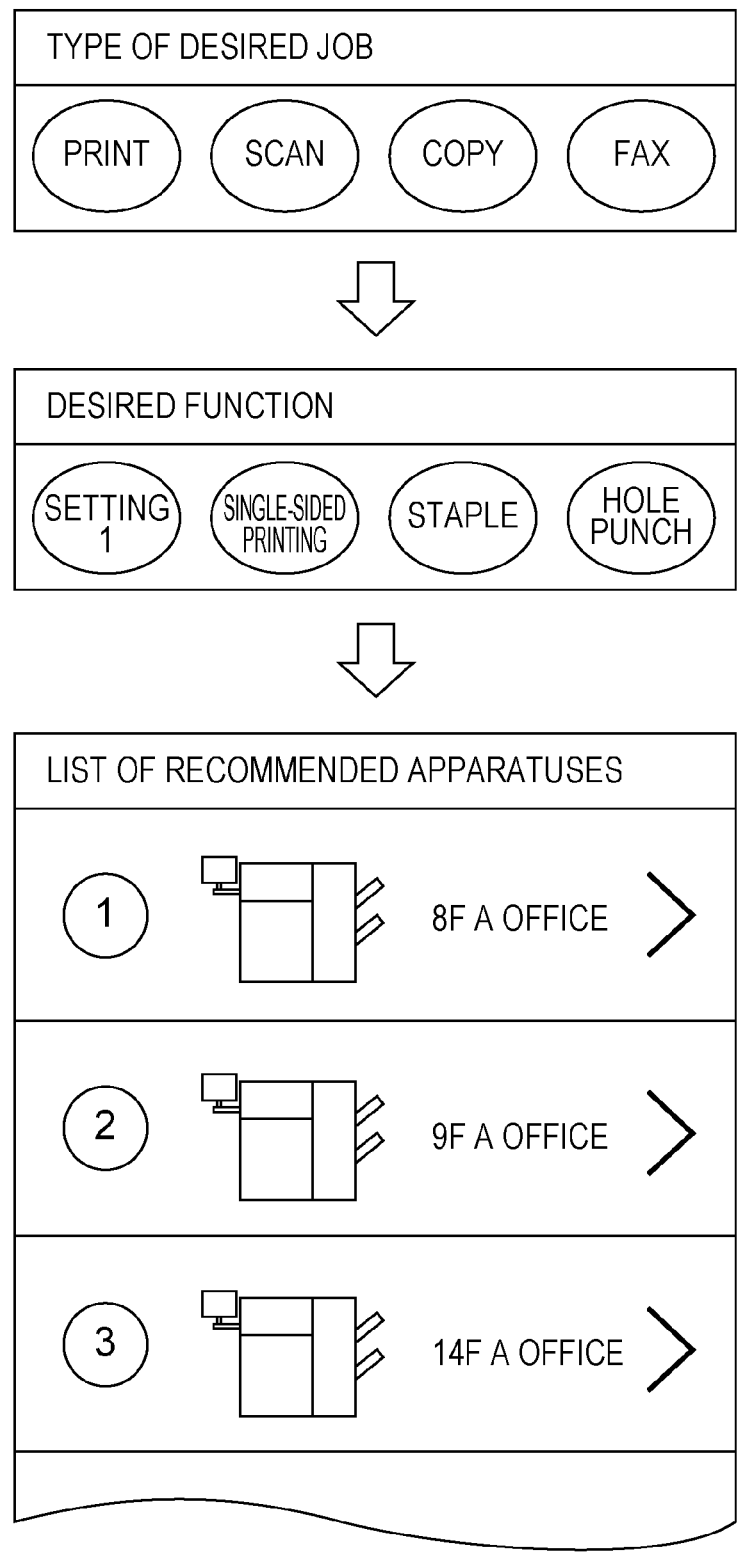
FIG. 15 is a diagram illustrating a display example of an apparatus search screen.

FIG. 15 is a diagram illustrating a display example of an apparatus search screen. The apparatus search screen is displayed when the apparatus search button 77 included in the status list screen (see FIG. 11) is selected. The apparatus search screen includes three screens described below, which are displayed in order.

First, a type selection screen for specifying the type of a job that a user wants to execute is displayed, and the type is specified. Then, a function selection screen for specifying a function that the user wants to use is displayed, and the function is specified. Then, a recommendation list screen which displays a list of the image forming apparatuses 3 that satisfy the specified type of job and the specified function, is displayed.

On the type selection screen, predetermined types of job (for example, a print job, a copy job, a scan job, a FAX job, and the like) are displayed. The types of job displayed on the type selection screen are set according to values which may be described as the "type of executable job" in the management database. When one type of job is selected on the type selection screen, an image forming apparatus 3 which is able to execute the selected type of job is narrowed down from the image forming apparatuses 3 recorded in the management database.

On the function selection screen, predetermined functions (for example, single-sided printing, staple, hole punch, and the like) are displayed. The functions displayed on the function selection screen are set according to values which may be described as the "available function" in the management database. An option (for example, setting 1) specifying one or plural functions set by a user may be displayed. When one function is selected on the function selection screen, an image forming apparatus 3 which is able to use the selected function is narrowed down from the image forming apparatuses 3 recorded in the management database.

On the recommendation list screen, a list of image forming apparatuses 3 which are able to execute the selected type of job and use the selected function is displayed. By referring to the recommendation list screen, the user is able to understand image forming apparatuses 3 that are able to execute the desired type of job and use the desired function. The plural image forming apparatuses 3 displayed on the recommendation list screen may be arranged in the order of proximity to the terminal 2 or in the order in which an apparatus becomes available, in a manner similar to the apparatus list screen (see FIG. 14).

Figure 16:
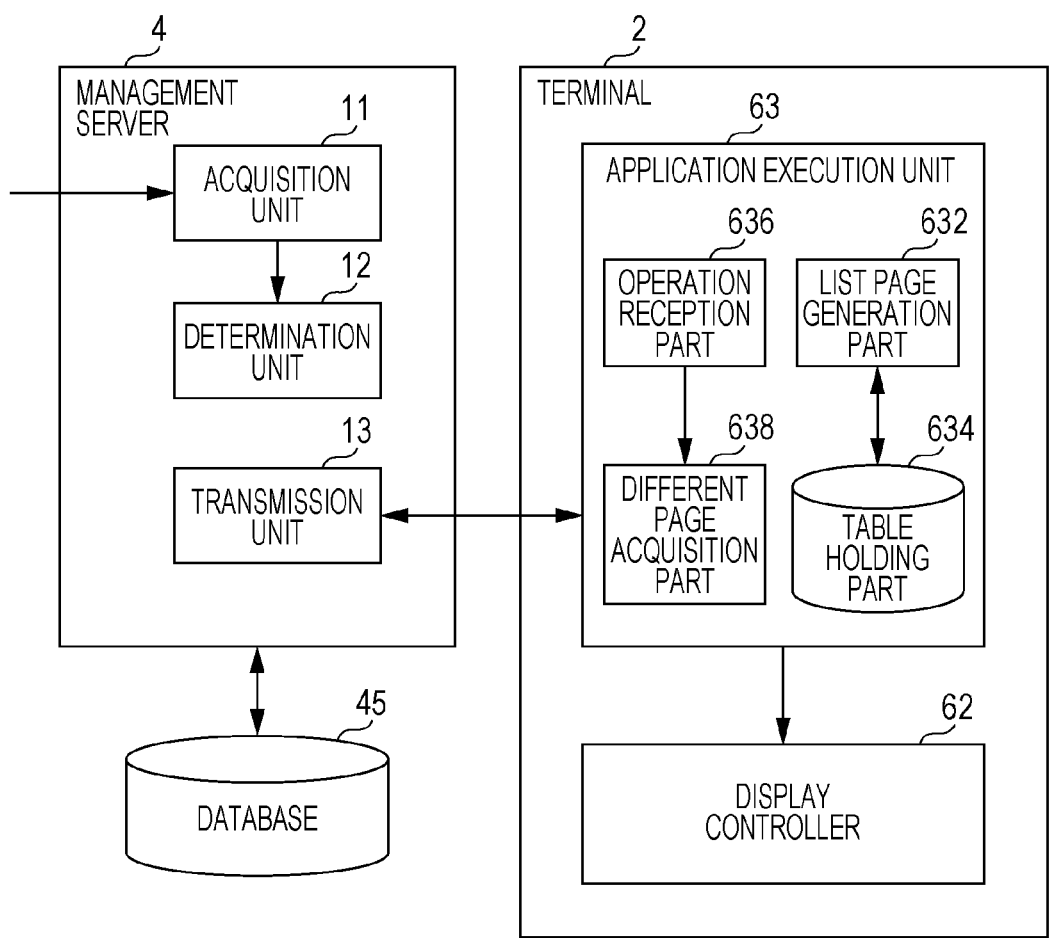
FIG. 16 is a block diagram illustrating an example of the functional configuration of a management server and a terminal.

FIG. 16 is a block diagram illustrating an example of the functional configuration of the management server 4 and the terminal 2. The same functional units as those in FIG. 9 are referred to with the same reference numbers, and explanation for those same units will be omitted.

The terminal 2 further includes an application execution unit 63. The application execution unit 63 includes a list page generation part 632, a table holding part 634, an operation reception part 636, and a different page acquisition part 638. The above function unit is also implemented when the controller 21 performs processing according to a program.

The application execution unit 63 is implemented when the controller 21 executes an application. The application execution unit 63 generates various screens to be displayed on the display unit 25, and controls screen transition.

The list page generation part 632 generates screen information of the status list screen (see FIG. 11) based on the content of the list screen display table held in the table holding part 634 when an icon image 5 (see FIG. 4) arranged on the home screen is selected by a user, and outputs the generated screen information of the status list screen to the display controller 62.

The operation reception part 636 receives a user operation. For example, the operation reception part 636 receives selection of the detail reference button 75, the list reference button 76, the apparatus search button 77, and the like included in the status list screen.

When the operation reception part 636 receives a user operation, the different page acquisition part 638 requires the management server 4 to send screen information corresponding to the operation. The transmission unit 13 of the management server 4 reads necessary information from the management database, generates the required screen information, and transmits the generated screen information to the terminal 2.

For example, when the detail reference button 75 is selected, the different page acquisition part 638 requires screen information of the apparatus detail screen (see FIG. 13), and acquires the screen information. When the list reference button 76 is selected, the different page acquisition part 638 requires screen information of the apparatus list screen (see FIG. 14), and acquires the screen information. When the apparatus search button 77 is selected, the different page acquisition part 638 requires the management server 4 to send screen information of the apparatus search screen (see FIG. 15), and acquires the screen information.

Transfer of the above screen information employs, for example, HTTP. That is, an HTTP daemon is activated at the management server 4, and a browser is activated at the terminal 2. When a processing request (HTTP request) is transmitted from the terminal 2 to the management server 4, a processing result (HTTP response) corresponding to the processing request is transmitted from the management server 4 to the terminal 2.

Although the exemplary embodiments of the present invention have been described above, the present invention is not limited to the foregoing exemplary embodiments. It is obvious to those skilled in the art that various modifications may be made to the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal comprising:
    a display that displays an icon image, from among a plurality of icon images and
    a central processing unit (CPU) configured to act as an availability information acquisition unit that acquires availability information which indicates whether or not a single image forming apparatus is available to execute one or more specific functions of a plurality of functions performed by the image forming apparatus,
    wherein the specific functions of the image forming apparatus include one or more printer functions performed by a printer that forms an image on a medium and one or more non-printer functions performed by a non-printer device, which does not use the printer,
    wherein the icon image is changed according to the availability information which is acquired by the availability information acquisition unit and which indicates whether or not the one or more specific functions of the image forming apparatus are available to be executed by the image forming apparatus,
    wherein the image forming apparatus is configured to execute a job using the printer functions of the printer, and execute a job using the non-printer functions of the non-printer device; and
    wherein, based on the availability of the image forming apparatus, the display displays:
      (i) a first icon image indicating that the image forming apparatus is available to execute a first job using the printer functions of the printer;

(ii) a second icon image simultaneously indicating that the image forming apparatus is not available to execute a second job which uses the printer functions of the printer, and the image forming apparatus is available to execute a third job using the non-printer functions of the non-printer device;

(iii) a third icon image indicating that the image forming apparatus is not available because another user is using the image forming apparatus;

(iv) a fourth icon image indicating that a management server cannot acquire information from the image forming apparatus; and (v) a fifth icon image indicating that the terminal cannot acquire information from the management server.

2. The terminal according to claim 1, wherein the image forming apparatus includes an operation panel to be operated by a user, and wherein when the operation panel of the image forming apparatus is being operated, the display displays, from among the plurality of icon images, the third icon image.

3. The terminal according to claim 1, wherein the image forming apparatus includes an operation panel to be operated by a user, and wherein when the operation panel of the image forming apparatus is not being operated and the image forming apparatus is executing the job which uses the printer, the display displays, from among the plurality of icon images, the second icon image.

4. The terminal according to claim 1, further comprising: a sensor that acquires positional information of at least one of the terminal and the image forming apparatus, wherein the display selects, from among the plurality of icon images, an image which is to be displayed as the icon image or an image which is to be added to the icon image and displayed, in accordance with positional information of the image forming apparatus and the terminal.

5. The terminal according to claim 1, wherein when selection of a sixth icon image of the plurality of icon images is received, the display displays a list screen which indicates whether or not each of a plurality of image forming apparatuses is available.

6. The terminal according to claim 5, wherein when selection of one of the plurality of image forming apparatuses is received, the display displays a confirmation screen which indicates a processing status of the selected image forming apparatus.

7. The terminal according to claim 1, wherein when selection of a type of job and/or selection of a function to be used is received, the display displays a list screen which indicates an image forming apparatus that is able to execute the selected type of job and/or use the selected function.

8. The terminal according to claim 1, wherein when notification which indicates that a status of the image forming apparatus has been changed from an unavailable state into an available state is received, the display displays a notification screen for notifying that the status of the image forming apparatus has been changed from the unavailable state into the available state.

9. The terminal according to claim 1, wherein when the image forming apparatus is executing a first job which uses the printer, and when a time until a next job is started is greater than or equal a threshold, the next job being a job to be performed after the first job, the display displays, from among a plurality of icon images, an icon image which indicates that: (i) a second job which uses the printer is not able to be executed; and (ii) the job which uses the non-printer device is able to be executed.

10. An information processing apparatus comprising:
a display that displays an icon image, from among a plurality of icon images; and
a central processing unit (CPU) configured to act as:
an availability information acquisition unit that acquires availability information which indicates whether or not a single image forming apparatus is available to execute one or more specific functions of a plurality of functions performed by the image forming apparatus,
wherein the specific functions of the image forming apparatus include one or more printer functions performed by a printer that forms an image on a medium and one or more non-printer functions performed by a non-printer device, which does not use the printer; and
a transmission unit that transmits the availability information,
wherein the image forming apparatus is configured to execute a job using the printer functions of the printer, and execute a job using the non-printer functions of the non-printer device, and
wherein, based on the availability of the image forming apparatus, the display displays:
(i) a first icon image indicating that the image forming apparatus is available to execute a first job using the printer functions of the printer;
(ii) a second icon image simultaneously indicating that the image forming apparatus is not available to execute a second job which uses the printer functions of the printer, and the image forming apparatus is available to execute a third job using the non-printer functions of the non-printer device;
(iii) a third icon image indicating that the image forming apparatus is not available because another user is using the image forming apparatus;
(iv) a fourth icon image indicating that a management server cannot acquire information from the image forming apparatus; and
(v) a fifth icon image indicating that the terminal cannot acquire information from the management server.

11. An image forming system comprising:
an image forming apparatus;
an information processing apparatus; and
a terminal,
wherein the information processing apparatus includes
a first availability information acquisition unit that acquires from the image forming apparatus availability information which indicates whether or not the image forming apparatus is available to execute one or more specific functions of a plurality of functions performed by the image forming apparatus,
wherein the specific functions of the image forming apparatus include one or more printer functions performed by a printer that forms an image on a medium and one or more non-printer functions performed by a non-printer device, which does not use the printer, and
a transmission unit that transmits the availability information to the terminal, and
wherein the terminal includes
a second availability information acquisition unit that acquires the availability information from the information processing apparatus, and a display that displays an icon image, from among a plurality of icon images, corresponding to the availability information, wherein the functions performed by the first availability information acquisition unit, the transmission unit, and the second availability information acquisition unit are achieved under control of a central processing unit (CPU), wherein the image forming apparatus is configured to execute a job using the printer functions of the printer, and execute a job using the non-printer functions of the non-printer device, and wherein, based on the availability of the image forming apparatus, the display displays:
  (i) a first icon image indicating that the image forming apparatus is available to execute a first job using the printer functions of the printer;
  (ii) a second icon image simultaneously indicating that the image forming apparatus is not available to execute a second job which uses the printer functions of the printer, and the image forming apparatus is available to execute a third job using the non-printer functions of the non-printer device;
  (iii) a third icon image indicating that the image forming apparatus is not available because another user is using the image forming apparatus;
  (iv) a fourth icon image indicating that a management server cannot acquire information from the image forming apparatus; and
  (v) a fifth icon image indicating that the terminal cannot acquire information from the management server.

12. A non-transitory computer readable medium storing a program causing a computer to execute a process comprising:

displaying an icon image, from among a plurality of icon images; and acquiring availability information which indicates whether or not a single image forming apparatus is available to execute one or more specific functions of a plurality of functions performed by the image forming apparatus, wherein the specific functions of the image forming apparatus include one or more printer functions performed by a printer that forms an image on a medium and one or more non-printer functions performed by a non-printer device, which does not use the printer, wherein the icon image is changed according to the acquired availability information which indicates whether or not the one or more specific functions of the image forming apparatus are available to be executed by the image forming apparatus, and wherein the image forming apparatus is configured to execute a job using the printer functions of the printer, and execute a job using the non-printer functions of the non-printer device; and based on the availability of the image forming apparatus, displaying:
  (i) a first icon image indicating that the image forming apparatus is available to execute a first job using the printer functions of the printer;
  (ii) a second icon image simultaneously indicating that the image forming apparatus is not available to execute a second job which uses the printer functions of the printer, and the image forming apparatus is available to execute a third job using the non-printer functions of the non-printer device;
  (iii) a third icon image indicating that the image forming apparatus is not available because another user is using the image forming apparatus;
  (iv) a fourth icon image indicating that a management server cannot acquire information from the image forming apparatus; and
  (v) a fifth icon image indicating that the terminal cannot acquire information from the management server.

13. A non-transitory computer readable medium storing a program causing a computer to execute a process for information processing, the process comprising:

acquiring availability information which indicates whether or not a single image forming apparatus is available to execute one or more specific functions of a plurality of functions performed by the image forming apparatus, wherein the specific functions of the image forming apparatus include one or more printer functions performed by a printer that forms an image on a medium and one or more non-printer functions performed by a non-printer device, which does not use the printer; and transmitting the availability information, wherein the image forming apparatus is configured to execute a job using the printer functions of the printer, and execute a job using the non-printer functions of the non-printer device; and displaying an icon image, from among a plurality of icon images, and based on the availability of the image forming apparatus, displaying:
  (i) a first icon image indicating that the image forming apparatus is available to execute a first job using the printer functions of the printer;
  (ii) a second icon image simultaneously indicating that the image forming apparatus is not available to execute a second job which uses the printer functions of the printer, and the image forming apparatus is available to execute a third job using the non-printer functions of the non-printer device;
  (iii) a third icon image indicating that the image forming apparatus is not available because another user is using the image forming apparatus;
  (iv) a fourth icon image indicating that a management server cannot acquire information from the image forming apparatus; and
  (v) a fifth icon image indicating that the terminal cannot acquire information from the management server.

* * * * *